(No Model.)
T. B. HUSSEY.
CULTIVATOR.
No. 455,212. Patented June 30, 1891.
Fig. 1.
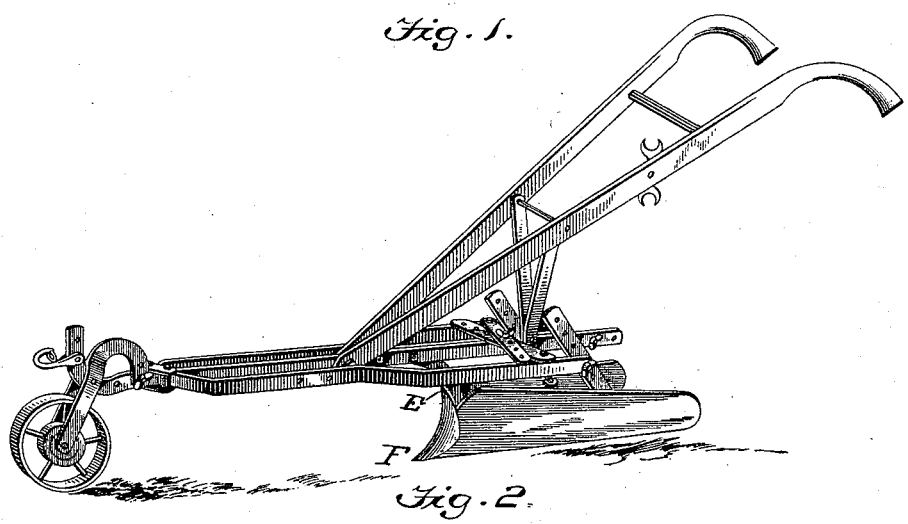
Fig. 2.
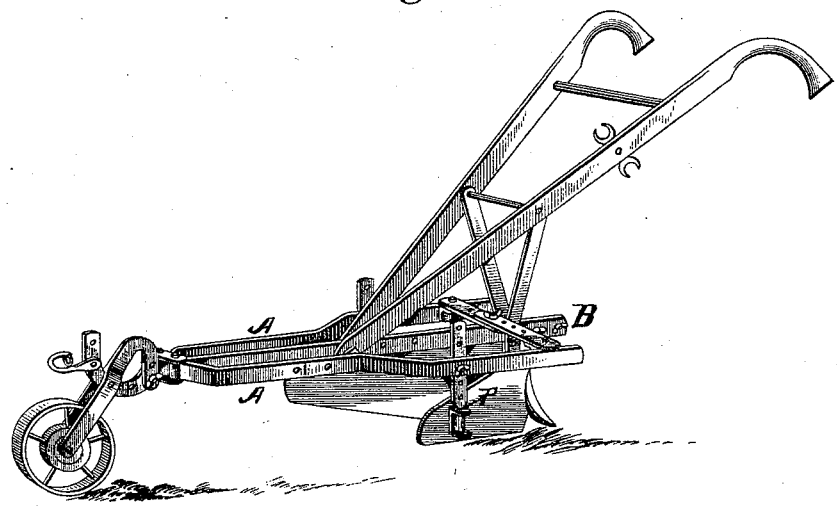
Fig. 4. Fig. 3. Fig. 5.
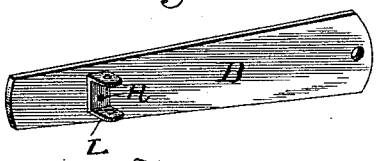
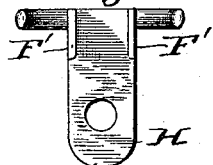
Witnesses:
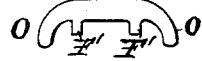
J. M. Fowler Jr.
H. J. Koerth.
Fig. 6.
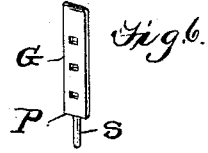
Inventor
Timothy B. Hussey
By Daniel Breed
Attorney.

UNITED STATES PATENT OFFICE.

TIMOTHY B. HUSSEY, OF NORTH BERWICK, MAINE.

CULTIVATOR.

SPECIFICATION forming part of Letters Patent No. 455,212, dated June 30, 1891.

Application filed January 12, 1891. Serial No. 377,501. (No model.)

*To all whom it may concern:*

Be it known that I, TIMOTHY B. HUSSEY, a citizen of the United States, residing at North Berwick, in the county of York and State of Maine, have invented certain new and useful Improvements in Cultivators; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to cultivators, with their parts so adapted as to admit of various changes for different kinds of work, and especially pertains to certain devices by means of which a furrowing-plow is changed into a coverer.

In the accompanying drawings, Figure 1 is a side elevation of my improved cultivator arranged as a furrower, the four shovels from the side bars of the frame being removed and one central shovel being retained. Fig. 2 is a side elevation of the same implement changed into a coverer. Fig. 3 shows one of the wings and the bracket for hinging it to the upright G. Figs. 4 and 5 are a plan view and an elevation of the saddle H, respectively. Fig. 6 is a perspective view of the upright G.

The frame of the cultivator consists of a central bar B and two side bars A A, hinged at their forward ends to central bar B, so as to be adjustable in width. As shown in Fig. 2, all the standards, except the middle standard E, have been removed. To this middle standard E the wings D D are attached at their forward ends by means of the little saddle or hinge, Fig. 4. When the wings D have been hooked onto the curved lugs O, Fig. 4, the saddle is then fastened to back edge of standard E, being held by the same bolt that holds the point F to front side of standard.

As will be seen in Fig. 4, the saddle H has flanges or shoulders F', one on each side, to prevent it from swinging around when fastened to the standard by a single bolt. The rear ends of the wings D are connected to the side bars A by the uprights G. The upright G, as shown, is drawn out or swaged at its lower end, so as to form the stud S and shoulder P. The double-lipped socket L, Fig. 3, forms a sort of journal-box for the stud S of the upright G. The shoulder P rests upon the upper lip of socket or upright journal-box, while the lower end of stud S is headed up or held by a nut after being passed through lower lip of socket. The socket L, Fig. 3, is pivoted on wing D by a single rivet R, having countersunk head. This method of connecting upright G to wing D gives to upright a double movement—viz., a forward and backward movement—swinging on rivet R, and also the movement allowed by stud S, rotating in socket L. The movements are necessary to expand or contract the frame, and also to changing the furrowing-plow into a coverer.

When it is desired to change the furrowing-plow, Fig. 1, into the coverer, Fig. 2, the middle standard E, Fig. 2, is unbolted from the middle bar B, and then the wings D, together with the standard E, are reversed completely around, so that the wide ends of wings D are backward and narrow ends forward, and standard E is bolted to rear end of middle bar B, and uprights G fastened to side bars A, as in Fig. 2. In reversing the wings D, in order to have the upright G and its socket L on the outer side of wings, as shown in Fig. 2, it is necessary simply to turn each wing upside down, (after first slackening the bolt that holds little saddle H and unhooking wings from lugs O,) thus making the upper edge of wing the lower, and bringing uprights G on outside of wings, then swing the uprights G around on the rivet R, so as to bring them up on what has now become upper edge of wing. The rotation of upright G on its stud and socket L now comes into play by allowing upright G to be brought up fair and flat against side bar A, however much frame may be expanded or contracted.

Having thus described my invention, what I claim as new, and desire to secure by Letters Patent, is—

In a cultivator, the combination, with a frame, of uprights G, secured thereto and having rounded lower ends, blades having brackets pivoted thereto, the brackets serving as bearings for the rounded portion of said upright, upon which the said blades may be turned, a standard secured to the said frame and carrying a point F, and a saddle having curved lugs O, adapted to engage the said blades, the said saddles being secured to the said point and having flanges F' thereon, as described.

In testimony whereof I affix my signature in presence of two witnesses.

TIMOTHY B. HUSSEY.

Witnesses:
WILLIAM T. HUSSEY,
GEORGE S. MANSFIELD.